United States Patent
Manabe et al.

(10) Patent No.: US 9,838,841 B2
(45) Date of Patent: Dec. 5, 2017

(54) TERMINAL DEVICE, COMMUNICATION SYSTEM, AND COMMUNICATION METHOD FOR EXECUTING CALL FOR COMMUNICATION

(71) Applicant: JVC KENWOOD Corporation, Yokohama-shi, Kanagawa (JP)

(72) Inventors: Shunichi Manabe, Yokohama (JP); Tomoko Yaginuma, Yokohama (JP); Masae Toko, Yokohama (JP); Yoshihiro Hotta, Yokohama (JP); Kazuya Tsukamoto, Yokohama (JP); Ichiro Shishido, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 15/275,402

(22) Filed: Sep. 25, 2016

(65) Prior Publication Data

US 2017/0094456 A1 Mar. 30, 2017

(30) Foreign Application Priority Data

Sep. 28, 2015 (JP) .................. 2015-189923

(51) Int. Cl.
*H04W 4/02* (2009.01)
*H04W 4/08* (2009.01)
*H04M 3/42* (2006.01)
*H04W 4/10* (2009.01)
*G01S 19/13* (2010.01)
*G01S 5/02* (2010.01)
*H04W 4/22* (2009.01)

(52) U.S. Cl.
CPC ............ *H04W 4/02* (2013.01); *G01S 5/0263* (2013.01); *G01S 19/13* (2013.01); *H04M 3/42042* (2013.01); *H04W 4/021* (2013.01); *H04W 4/08* (2013.01); *H04W 4/10* (2013.01); *H04M 2250/10* (2013.01); *H04W 4/22* (2013.01)

(58) Field of Classification Search
CPC .......... H04W 4/02; H04W 4/08; H04W 4/10; H04W 4/021; H04W 4/22; H04W 4/023; H04M 3/42042; H04M 2250/10; H04M 3/42357; G01S 19/13; G01S 5/0263
USPC .............. 455/404.2, 417, 95, 414.1, 456.3; 709/202
See application file for complete search history.

(56) References Cited

U.S. PATENT DOCUMENTS

2013/0346471 A1* 12/2013 Park ................. H04L 67/10
709/202

FOREIGN PATENT DOCUMENTS

JP 2009-177639 8/2009

* cited by examiner

*Primary Examiner* — Phuoc H Doan
(74) *Attorney, Agent, or Firm* — Brundidge & Stanger, P.C.

(57) ABSTRACT

An acquisition unit acquires positional information. A storage unit stores a list in which a plurality of correspondence relationships between an area including positional information that can be acquired in the acquisition unit and an identifier are included. A selection unit selects, from the list stored in the storage unit, an identifier corresponding to the positional information acquired in the acquisition unit. A communication unit receives, from a calling device, a call signal including an identifier to be called. A control unit makes, when the identifier included in the call signal received in the communication unit matches the identifier selected in the selection unit, the communication unit execute communication.

8 Claims, 12 Drawing Sheets

22

| AREA NO. | AREA COORDINATE |
|---|---|
| 1 | A |
| 2 | B |
| 3 | C |
| ⋮ | ⋮ |

22

| LIST NO. | LIST |
|---|---|
| 1 | FIRST LIST |
| 2 | SECOND LIST |
| ⋮ | ⋮ |

22

TERMINAL DEVICE, COMMUNICATION SYSTEM, AND COMMUNICATION METHOD FOR EXECUTING CALL FOR COMMUNICATION

CROSS-REFERENCE TO RELATED APPLICATION

This application is based upon and claims the benefit of priority from the prior Japanese Patent Application No. 2015-189923, filed on Sep. 28, 2015, the entire contents of which are incorporated herein by reference.

BACKGROUND

1. Field

The present invention relates to a communication technique, and in particular, to a terminal device, a communication system, and a communication method for executing a call for communication.

2. Description of the Related Art

It is desirable to enable group communication through mobile stations located in a designated area without taking a time for setting the group communication. Accordingly, each mobile station acquires positional information on its own by an incidental GPS (Global Positioning System) receiver. A control office transmits a call signal for the group communication by adding area information on a mobile station that is a target of the group communication. The mobile station receives the group communication from the control office when the positional information on its own and the area information in the call signal match each other (for example, Patent Document 1).

[Patent Document 1] Japanese Patent Application Publication No. 2009-177639

Because positional information is generally indicated by latitude and longitude, area information to be compared with the positional information is also indicated by them. On the other hand, it is more desirable that a call of group communication in a desired area is simpler.

SUMMARY

In order to solve the aforementioned issue, a terminal device according to an aspect of an embodiment comprises: an acquisition unit that acquires positional information; a storage unit that stores a list in which a plurality of correspondence relationships between an area including positional information that can be acquired in the acquisition unit and an identifier are included; a selection unit that selects, from the list stored in the storage unit, an identifier corresponding to the positional information acquired in the acquisition unit; a communication unit that receives, from a calling device, a call signal including an identifier to be called; and a control unit that, when the identifier included in the call signal received in the communication unit matches the identifier selected in the selection unit, makes the communication unit execute communication.

Another aspect of an embodiment is a communication system. This communication system comprises a calling device and a terminal device. The terminal device includes: an acquisition unit that acquires positional information; a storage unit that stores a list in which a plurality of correspondence relationships between an area including positional information that can be acquired in the acquisition unit and an identifier are included; a selection unit that selects, from the list stored in the storage unit, an identifier corresponding to the positional information acquired in the acquisition unit; a communication unit that receives, from the calling device, a call signal including an identifier to be called; and a control unit that, when the identifier included in the call signal received in the communication unit matches the identifier selected in the selection unit, makes the communication unit execute communication.

A still another aspect of an embodiment is a communication method. This method comprises the steps of: acquiring positional information; selecting, from a list in which a plurality of correspondence relationships between an area including positional information that can be acquired and an identifier are included, an identifier corresponding to the acquired positional information; receiving, from a calling device, a call signal including an identifier to be called; and executing communication when the identifier included in the received call signal matches the selected identifier.

It is to be noted that any optional combination of the aforementioned constituent elements and any embodiment obtained by transforming what is expressed by the present embodiments into a method, an apparatus, a system, a recording medium, a computer program, and so on are also effective as other aspects of the present embodiments.

BRIEF DESCRIPTION OF THE DRAWINGS

Embodiments will now be described, byway of example only, with reference to the accompanying drawings, which are meant to be exemplary, not limiting, and wherein like elements are numbered alike in several figures, in which.

DETAILED DESCRIPTION

The invention will now be described by reference to the preferred embodiments. This does not intend to limit the scope of the present invention, but to exemplify the invention.

Example 1

Prior to the specific description of the present invention, the outline thereof will be given first. Example 1 relates to a communication system corresponding to business-use radio. In the business-use radio, audio communication is executed through a predetermined radio channel. One example of the audio communication is PTT (Push to Talk). In PTT, a user pushes a button at the beginning of a phone conversation and releases the button at the end of it. In the business-use radio, it is also possible to form a group by a plurality of terminal devices. A base station device in the business-use radio assigns an uplink channel and a downlink channel to the group. Under such a situation, one terminal device of the group transmits a signal through the uplink channel, and another terminal device thereof receives the signal through the downlink channel. In a call of such group communication, a plurality of terminal devices included in the group are called.

However, there is a case where it is desirable to call a terminal device present in a specific location as a communication target. Examples of the case include, for example, a case where a fire has occurred in a building and the headquarters of a fire department needs, upon receiving a report of the fire, to perform a phone conversation with a fireman (or firemen) or a policeman (policemen) present closest to the fire scene in order to dispatch firemen and policemen thereto. In order to call only a fireman (firemen) or a policeman (policemen) present close to a scene, work for identifying the position of the scene and who is the person present close thereto is required, even when the headquarters grasps the present position of each of firemen and policemen through a GPS device possessed by each of them, which takes time and effort. In order to deal with this, a plurality of areas, each having a size of, for example, 1 km×1 km, are defined and an identifier for identifying an area (hereinafter, referred to as an "area No.") is given to each area in the communication system according to the present Example. Each terminal device recognizes the area No. of its own based on the acquired positional information. The base station device transmits a call signal including an area No. corresponding to an area to be called to a plurality of terminal devices. The terminal device executes communication when the area No. included in the call signal is the same as the area No. of its own.

Figure 1:
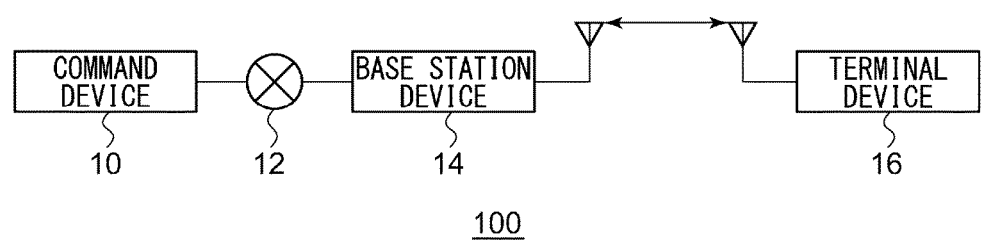
FIG. 1 is a view illustrating a configuration of a communication system according to Example 1.

FIG. 1 illustrates a configuration of a communication system 100 according to Example 1. The communication system 100 includes a command device 10, a network 12, a base station device 14, and a terminal device 16. The command device 10 is a communication device that is installed in the aforementioned headquarters in order to be operated by a commander of the headquarters. The commander executes a call of the terminal device 16 by operating the command device 10, and also executes communication with the called terminal device 16, for example, a phone conversation. Prior to the call, the command device 10 receives positional information to be called. The positional information is indicated, for example, by latitude and longitude.

Herein, the commander inputs positional information by inputting latitude and longitude to the command device 10. Alternatively, the commander may input positional information by selecting one point of map information that are displayed by a display unit (not illustrated) provided in the command device 10. The command device 10 outputs a call request including the positional information (hereinafter, referred to as "call information") to the base station device 14 via the network 12. The network 12 connects the command device 10 to the base station device 14. One base station device 14 is illustrated in FIG. 1 for clarity of the description, but a plurality of them may be connected to the network 12.

The base station device 14 is one corresponding to a business-use radio system. Because publicly known techniques may be used for business-use radio, description thereof will be omitted herein. The base station device 14 is connected to the terminal device 16 through business-use radio at one end side, and connected to the network 12 at the other end side. When call information from the network 12 is input, the base station device 14 generates a signal (hereinafter, referred to as a "call signal") for calling the terminal device 16 in the business-use radio system. The base station device 14 transmits the call signal to the terminal device 16. The transmission executed herein corresponds to broadcasting. Herein, at least one of the base station device 14 and the command device 10 may be collectively referred to as a "calling device."

The terminal device 16 can execute communication through business-use radio. The terminal device 16 is a communication device that can be operated, for example, by a fireman or a policeman. A fireman or a policeman executes a phone conversation with the command device 10 by operating the terminal device 16. The phone conversation is initiated after a call signal from the base station device 14 is received. One terminal device 16 is illustrated in FIG. 1 for clarity of the description, but a plurality of the terminal devices 16 may be connected to the base station device 14.

Figure 2:
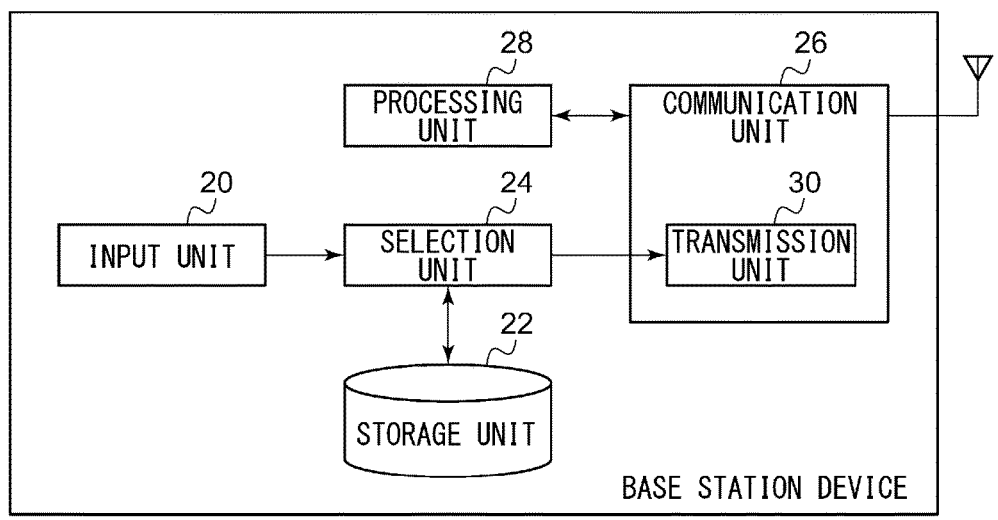
FIG. 2 is a view illustrating a configuration of a base station device in FIG. 1.
Figures 3, 4:
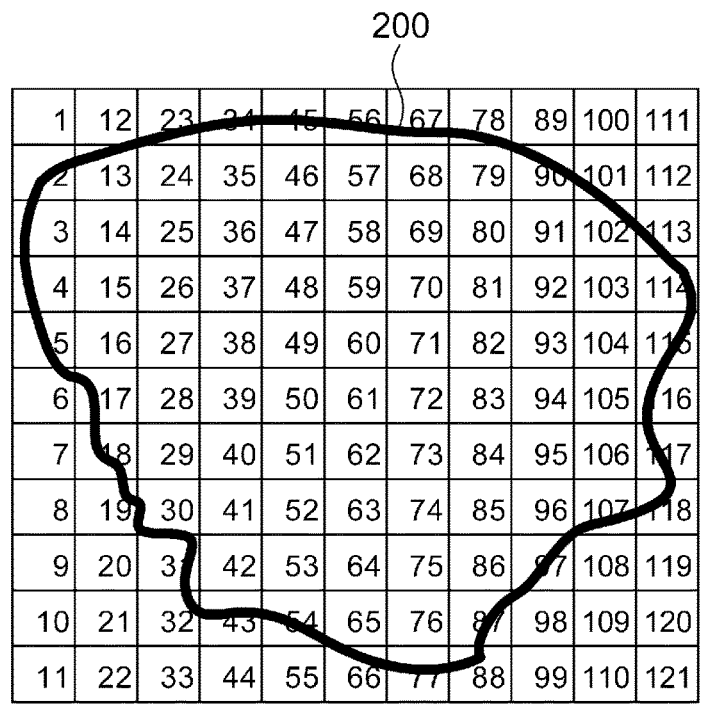
FIG. 3 is a view illustrating an area corresponding to a list stored in a storage unit in FIG. 2.
FIG. 4 is a view illustrating a data structure of a list stored in the storage unit in FIG. 2.

FIG. 2 illustrates a configuration of the base station device 14. The base station device 14 includes an input unit 20, a storage unit 22, a selection unit 24, a communication unit 26, and a processing unit 28. The communication unit 26 includes a transmission unit 30. The storage unit 22 stores a list in which a plurality of correspondence relationships between an area and an area No. are included. Herein, this list will be described with reference to FIG. 3. FIG. 3 illustrates areas corresponding to the list stored in the storage unit 22. A predetermined area is divided into areas each having a rectangular shape having a size of, for example, 1 km×1 km. An area No., such as "1," which is an identifier, is given to each area. The shape of the area may be an arbitrary shape without being limited to a rectangular shape. Additionally, the areas may overlap each other.

FIG. 4 illustrates a data structure of the list stored in the storage unit 22. As illustrated, an "Area No." and an "Area Coordinate" are caused to correspond to each other. The area coordinate indicates the coordinates of two diagonal apexes of the area illustrated in FIG. 3. When the length of one side of the rectangular shape is known, the area coordinate may be the central coordinate of the area. The range of the jurisdictional area (jurisdictional range 200) of the headquarters, which is illustrated in FIG. 3, indicates a range where communication with the base station device 14 can be executed. Refer back to FIG. 2.

The input unit 20 inputs call information from the command device 10 via the non-illustrated network 12. Because positional information is included in the call information, as described above, it can be said that the call information is information on an area to be called. For example, when "hit-and-run" has occurred in the area "5," the positional information included in the call information indicates a coordinate within the area "5." Additionally, when a "fire" has occurred in the area "38," the positional information included in the call information indicates a coordinate within the area "38." The input unit 20 outputs the call information to the selection unit 24.

The selection unit 24 inputs the call information from the input unit 20. The selection unit 24 selects, from the list stored in the storage unit 22, an area No. corresponding to the positional information included in the call information. When the positional information is a coordinate within the area "5," as described above, the selection unit 24 selects the area No. "5." Alternatively, the selection unit 24 may select not only the area No. "5" but also the area No. at the periphery of the area No. "5." The selection unit 24 generates a call signal including one or more selected area Nos. in order to output to the transmission unit 30.

The communication unit 26 has a transmitting and receiving function of the business-use radio system. The transmission unit 30 in the communication unit 26 inputs the call signal from the selection unit 24. The transmission unit 30 transmits the call signal. The transmission executed herein corresponds to broadcasting, as described above. When the communication unit 26 receives, after the transmission of the call signal, response signals to the call signal from one or more terminal devices 16, the processing unit 28 executes communication with the one or more terminal devices 16 via the communication unit 26.

This configuration is implemented in the hardware by any CPU of a computer, memory, and other LSI, and implemented in the software by a computer program or the like that is loaded in a memory. Herein, functional blocks implemented by the cooperation of hardware and software are depicted. Thus, it is to be understood by a person skilled in the art that these functional blocks can be implemented in various forms, namely, solely in hardware, solely in software, or through a combination of hardware and software.

Figure 5:
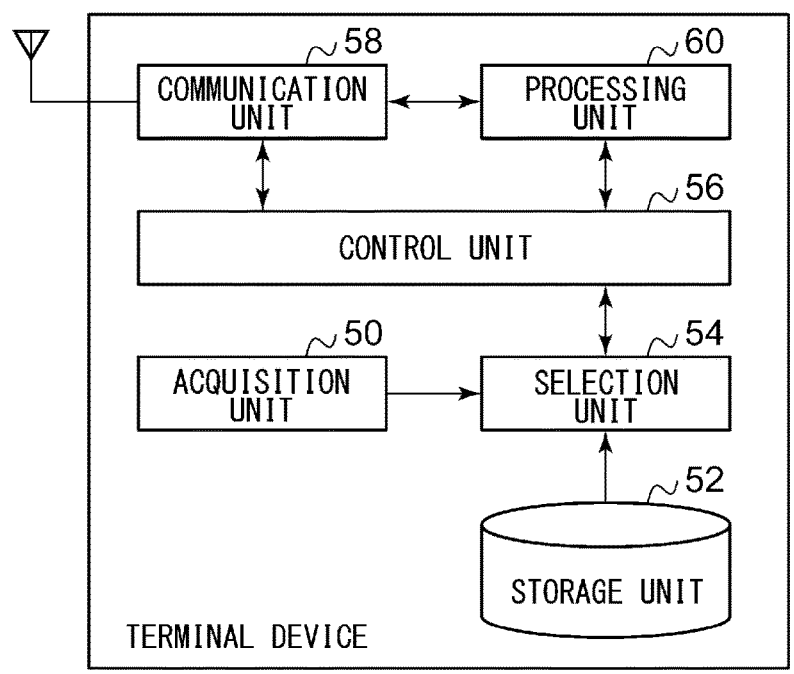
FIG. 5 is a view illustrating a configuration of a terminal device in FIG. 1.

FIG. 5 illustrates a configuration of the terminal device 16. The terminal device 16 includes an acquisition unit 50, a storage unit 52, a selection unit 54, a control unit 56, a communication unit 58, and a processing unit 60. The acquisition unit 50 has a positioning function by GPS, and periodically acquires positional information on the terminal device 16. Alternatively, the positioning function provided by the acquisition unit 50 may correspond to other systems other than GPS. Also herein, the positional information is indicated, for example, by latitude and longitude. The acquisition unit 50 outputs the positional information to the selection unit 54.

The storage unit 52 stores a list in which a plurality of correspondence relationships between an area including positional information that can be acquired in the acquisition unit 50 and an area No. are included. This list is the same as that stored in the storage unit 22 in FIG. 2, i.e., the list illustrated in FIG. 4. That is, the terminal device 16 and the base station device 14 hold a common list. The selection unit 54 selects, from the list stored in the storage unit 52, an area No. corresponding to the positional information acquired in the acquisition unit 50. In the following description, an area No. determined in accordance with this positional information may be referred to as a "first area No." The selection unit 54 outputs the selected area No. to the control unit 56. Alternatively, the area No. selected in the selection unit 54 may be transmitted from the communication unit 58 to the base station device 14 and the command device 10.

The communication unit 58 executes communication with the base station device 14 through business-use radio. The communication unit 58 receives the call signal from the base station device 14. As described above, the call signal includes an area No. to be called. In the following description, the area No. included in this call signal may be referred to as a "second area No." The communication unit 58 inputs the area No. included in the call signal to the control unit 56.

The control unit 56 inputs both the area No. from the communication unit 58 and the area No. from the selection unit 54. When both the area Nos. match each other, the control unit 56 determines to execute communication with the base station device 14 and the command device 10 via the network 12. Alternatively, when a plurality of area Nos. are input from the communication unit 58, and when one of the area Nos. and the area No. from the selection unit 54 match each other, the control unit 56 determines to execute communication. When the control unit 56 determines to execute communication, the communication unit 58 transmits a response signal to the base station device 14. Subsequently, the communication unit 58 and the processing unit 60 execute communication.

Figure 6:
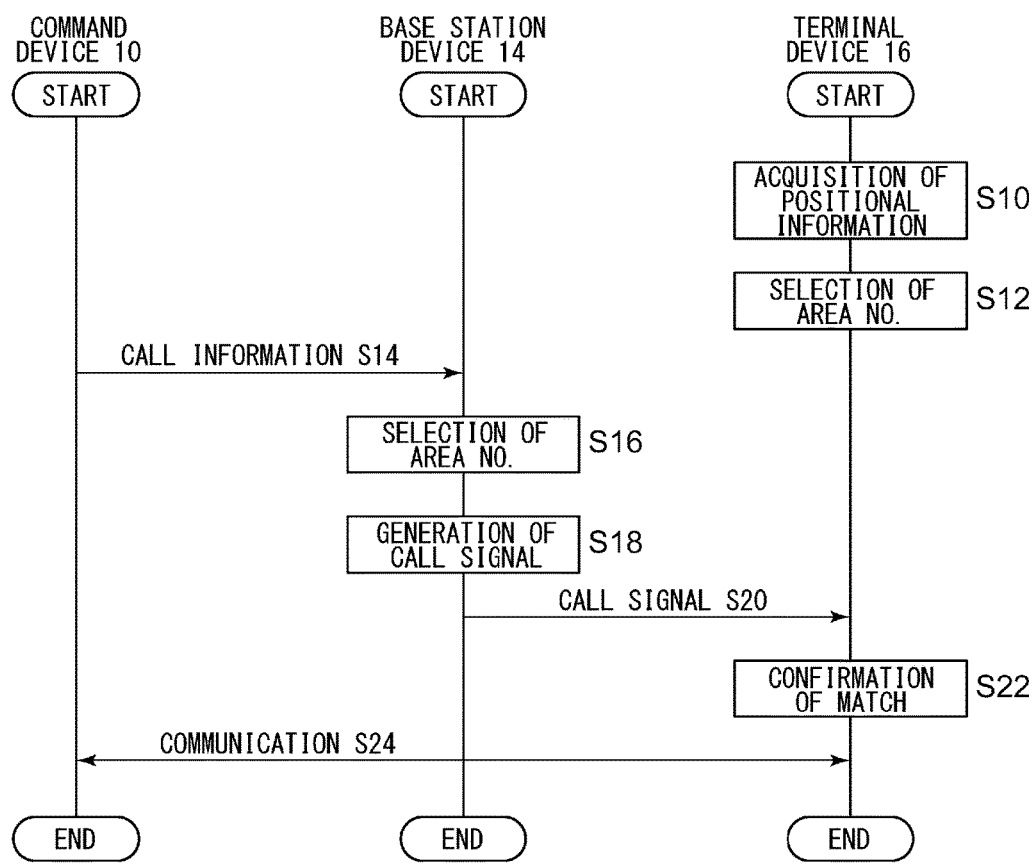
FIG. 6 is a sequence diagram illustrating communication procedures by the communication system of FIG. 1.

An operation of the communication system 100 configured as described above will be described. FIG. 6 is a sequence diagram illustrating communication procedures by the communication system 100. The terminal device 16 acquires positional information (S10). The terminal device 16 selects an area No. (S12). The command device 10 transmits call information to the base station device 14 (S14). The base station device 14 selects an area No. (S16), and generates a call signal (S18). The base station device 14 transmits the call signal (S20). When the terminal device 16 confirms the match between the area Nos. (S22), the command device 10 and the terminal device 16 execute communication (S24).

Figure 7:
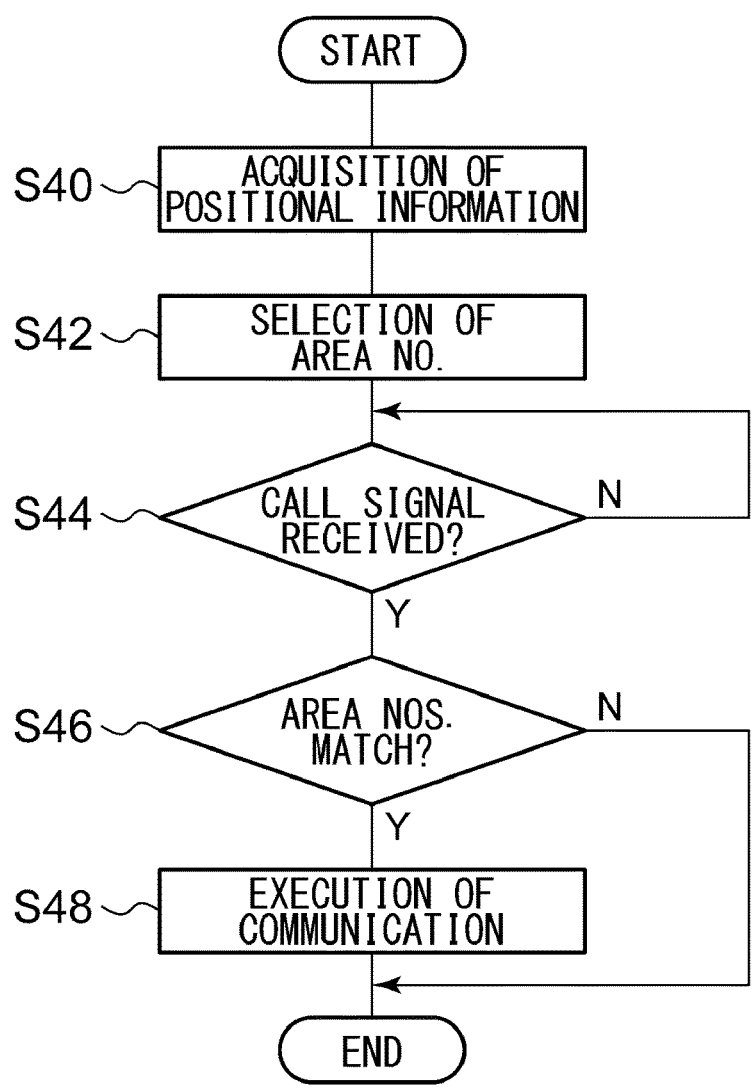
FIG. 7 is a flowchart illustrating communication procedures by the terminal device of FIG. 5.

FIG. 7 is a flowchart illustrating communication procedures by the terminal device 16. The acquisition unit 50 acquires positional information (S40). The selection unit 54 selects an area No. (S42). When not receiving a call signal (S44/N), the communication unit 58 stands by. When the communication unit 58 receives a call signal (S44/Y), and when the area Nos. match each other (S46/Y), the communication unit 58 and the processing unit 60 execute communication (S48). When the area Nos. do not match each other (S46/N), Step 48 is skipped.

According to the present Example, a terminal device is called by using an area No., and hence a call of a predetermined area can be easily executed. Because an area No. selected from a list stored in a storage unit is compared with an area No. included in a call signal, a call can be made only by receiving the call signal including the area No. Further, a call can be made only by receiving a call signal including an area No., a traffic amount can be reduced. Furthermore, a phone conversation can be performed by designating only an area to be called, and hence it becomes unnecessary to find out who is present in the area. Still furthermore, it becomes unnecessary to find out who is present in an area, and hence the time until a phone conversation can be reduced.

Still furthermore, a terminal device voluntarily switches to an area No. corresponding to positional information so as to stand by at the area No., and hence communication with the base station device can be made unnecessary. Still furthermore, communication with the base station device becomes unnecessary, and hence a traffic amount of a radio interval can be reduced. Still furthermore, an amount of data to be transmitted from the base station device to a terminal device can be reduced.

Example 2

Example 2 will now be described. Similarly to Example 1, Example 2 corresponds to business-use radio, and relates to a communication system in which a terminal device is called by an area No. Each of a base station device and the terminal device in Example 2 holds a plurality of lists, so that one common list is selected and used in accordance with a predetermined condition. This is because a case is assumed in which, for example, in an area where safety is maintained during daytime but is decreased during nighttime, the number of patrolling policemen is increased during nighttime than during daytime. If a crime has occurred at a location in the area during nighttime and all of the policemen in charge of the area move to the crime scene, the patrol of areas other than the crime scene becomes poor, and hence in order to avoid such a situation, it is desirable to dispatch only the requisite minimum number of policemen to the scene. A communication system 100 and a terminal device 16 according to Example 2 are of similar types to those illustrated in FIGS. 1 and 5, respectively. The description herein centers on the differences.

Figures 8, 9:
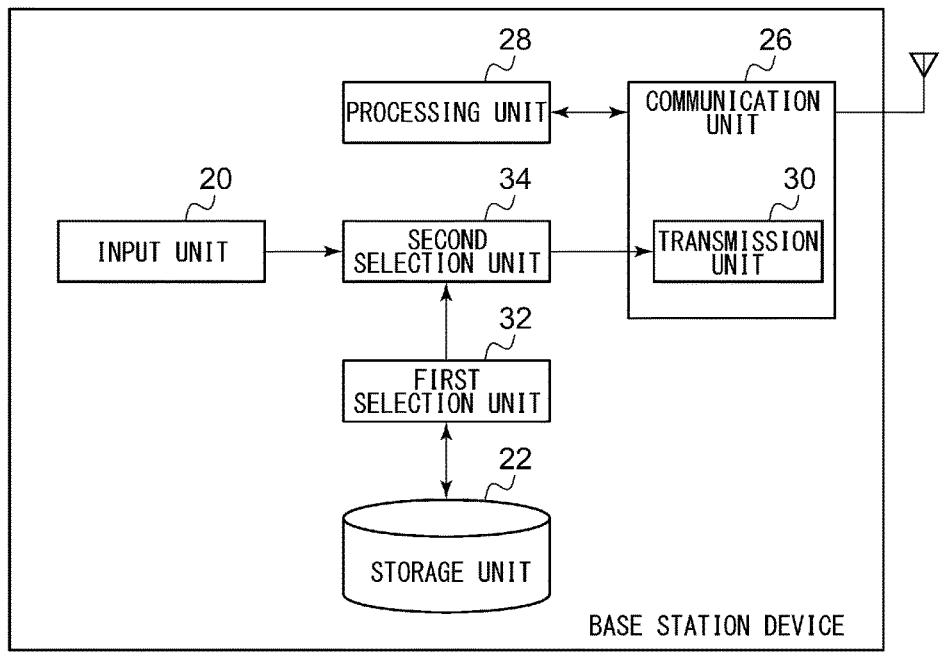
FIG. 8 is a view illustrating a configuration of a base station device according to Example 2.
FIG. 9 is a view illustrating a data structure of a list stored in a storage unit in FIG. 8.

FIG. 8 illustrates a configuration of a base station device 14 according to Example 2. The base station device 14 includes an input unit 20, a storage unit 22, a communication unit 26, a processing unit 28, a first selection unit 32, and a second selection unit 34. The communication unit 26 includes a transmission unit 30.

The storage unit 22 stores a plurality of types of lists. FIG. 9 illustrates a data structure of the lists stored in the storage unit 22. As illustrated, the plurality of types of lists are indicated as a first list, a second list, and so on. Similarly to FIG. 4, area No. and area coordinate are caused to correspond to each other in each list. For example, the first list is a list for daytime (6:00 am to 6:00 pm), and the second list is a list for nighttime (6:00 pm to 6:00 am). Additionally, an area in the first list has a rectangular shape having a size of 1 km×1 km, while that in the second list has a rectangular shape having a size of 100 m×100 m. That is, each of the plurality of types of lists corresponds to an area having a different size. Herein, the aforementioned lists for daytime and nighttime are only illustrative, and three or more lists may be used. Refer back to FIG. 8.

The first selection unit 32 has a timing function so as to acquire a time. In accordance with the time, the first selection unit 32 selects one of the plurality of types of lists stored in the storage unit 22. That is, the first selection unit 32 selects one of the plurality of types of lists stored in the storage unit 22 in accordance with a predetermined rule (list selection rule) with respect to time. For example, the first selection unit 32 selects the first list when the time is within 6:00 am to 6:00 pm, while selects the second list when the time is within 6:00 pm to 6:00 am. The second selection unit 34 inputs the call information from the input unit 20. The second selection unit 34 selects, from the list selected in the first selection unit 32, an area No. corresponding to the positional information included in the call information. The selection may be performed similarly to the selection unit 24. The second selection unit 34 generates a call signal including the selected one or more area Nos., and outputs it to the transmission unit 30.

In the terminal device 16 of FIG. 5, the storage unit 52 stores a plurality of types of lists. These lists are the same as those stored in the storage unit 22 in FIG. 8. The selection unit 54 switches to and uses one of the plurality of types of lists stored in the storage unit 52. Similarly to the first selection unit 32, the selection unit 54 has a timing function so as to acquire a time. In accordance with the time, the selection unit 54 selects one of the plurality of types of lists stored in the storage unit 52. That is, the selection unit 54 selects one of the plurality of types of lists stored in the storage unit 52 in accordance with a predetermined rule (list selection rule) with respect to time. The same rule is used in the first selection unit 32 and the selection unit 54. Accordingly, the selection unit 54 autonomously executes switching so as to use the same list as the list used in the base station device 14, even when an instruction is not sent from the base station device 14. Alternatively, in order to reduce an error between the timing function of the first selection unit 32 and that of the selection unit 54, a time synchronization function may be provided. Alternatively, the rule to be used in the first selection unit 32 and the selection unit 54 is not limited only to a rule with respect to time, and other rules may be used.

The selection unit 54 and the first selection unit 32 may switch a list in accordance with, for example, a day of the week, month and day, elapsed days from the beginning of a month, ambient illuminance, atmospheric pressure (weather), temperature, humidity, or the like. For example, a sensor (not illustrated) for measuring illuminance, atmospheric pressure, temperature, humidity, or the like, may be embedded in the terminal device 16, thereby allowing the selection unit 54 to acquire sensor data, and one of the plurality of types of lists stored in the storage unit 52 may be selected in accordance with the sensor data. In this case, a sensor similar to that embedded in the terminal device 16 is installed in the base station device 14 or an external device, and the first selection unit 32 selects a list by using the data. Alternatively, the command device 10 or the base station device 14 may collect data from a plurality of sensors installed in a dispersed manner within the range of the jurisdictional area (jurisdictional range 200) of the headquarters, and the first selection unit 32 may select a list based on the total data of them. Alternatively, the command device 10 or the base station device 14 may acquire various weather information from the outside in order to estimate sensor data in the terminal device 16, and the first selection unit 32 may select a list in accordance with the estimated value. Alternatively, data from a sensor embedded in the terminal device 16 may be transmitted from the terminal device 16 to the base station device 14, and the first selection unit 32 may select a list in accordance with the data. For example, each of the terminal device 16 and the base station device 14 selects a list in accordance with a common rule that is specified as follows: "when the atmospheric pressure becomes 990 hPa or lower, a low-pressure system, such as a typhoon, is expected to approach, and hence a list, in which the area of an area where the risk of disaster occurrence is high, such as a seashore, river, or cliff, is small (the area is finely divided), is selected." Alternatively, a list may be selected by using a rule in which a plurality of time and various sensor data are combined. That is, the selection unit 54 and the first selection unit 32 can select a list in accordance with at least one of time information, calendar information, and sensor information. Further, the selection unit 54 selects, from the selected list, an area No. corresponding to the positional information acquired in the acquisition unit 50. The selection unit 54 outputs the selected area No. to the control unit 56.

Figure 10:
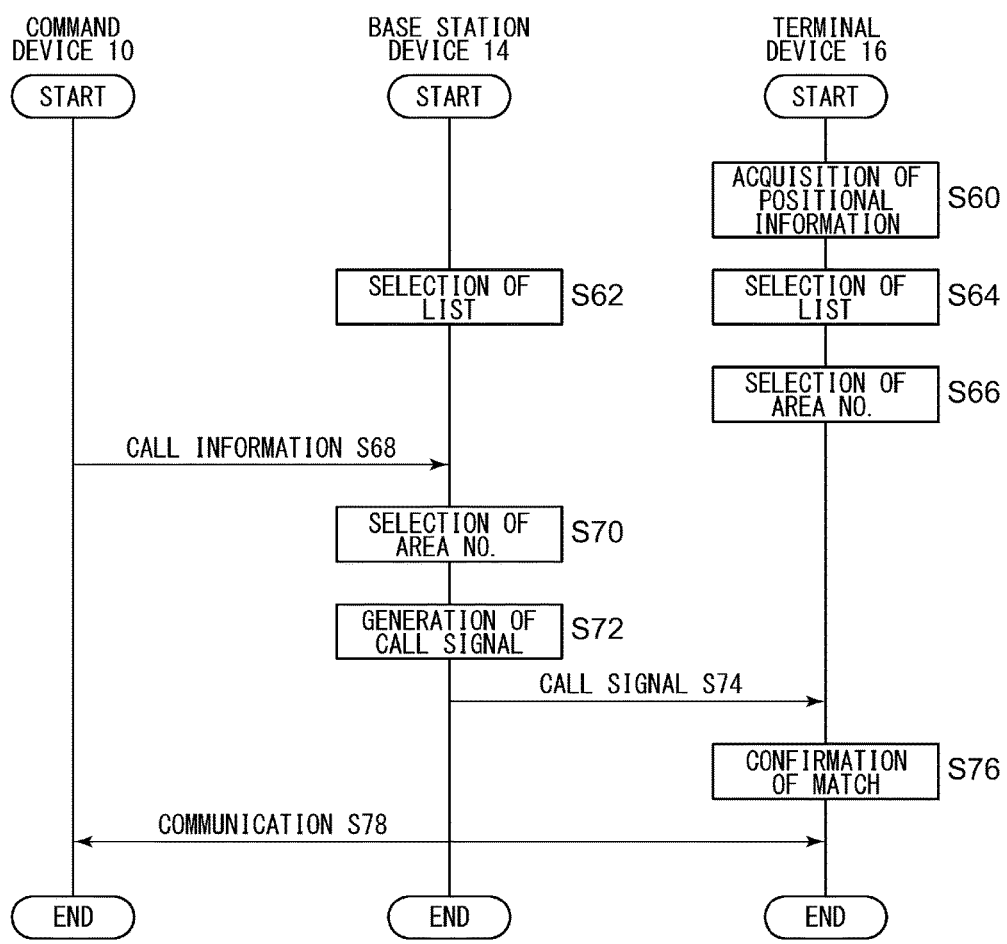
FIG. 10 is a sequence diagram illustrating communication procedures by a communication system according to Example 2.

An operation of the communication system 100 configured as described above will be described. FIG. 10 is a sequence diagram illustrating communication procedures by the communication system 100 according to Example 2. The terminal device 16 acquires positional information (S60). The base station device 14 selects a list (S62), and the terminal device 16 also selects a list (S64). The terminal device 16 selects an area No. (first area No.) (S66). The command device 10 transmits call information to the base station device 14 (S68). The base station device 14 selects an area No. (second area No.) (S70), and generates a call signal (S72). The base station device 14 transmits the call signal (S74). When the terminal device 16 confirms the match between the first area No. and the second area No. (S76), the command device 10 and the terminal device 16 execute communication (S78).

According to the present Example, one of a plurality of types of lists is switched to and used, and hence a list in accordance with a situation can be used. Further, each of the base station device 14 and the terminal device 16 autonomously executes switching of lists by using a common list selection rule, and hence the communication with a base station device for switching a list can be made unnecessary. Furthermore, the communication with a base station device for switching a list becomes unnecessary, and hence a traffic amount can be reduced. Still furthermore, a plurality of lists are stored in a base station device, and hence a list can be switched in accordance with a predetermined condition. Still furthermore, the size of an area covered by one area No. is changed by switching a list, the target region of the terminal devices that can be called can be changed. Accordingly, the size of an area, for which only the requisite minimum number of policemen can be called, can be set in accordance with a time zone.

Example 3

Example 3 will now be described. Similarly to the above description, Example 3 corresponds to business-use radio, and relates to a communication system in which a terminal device is called by an area No. Each of a base station device and the terminal device in Example 3 also hold a plurality of lists, so that one common list is selected and used in accordance with a predetermined condition. Herein, particularly in order to change the size of an area in accordance with the type of an event that has occurred, a list is switched in accordance with the type of an event that has occurred, such as, for example, an event in which 100 persons gather or an event in which 1000 persons gather. A communication system 100 and a terminal device 16 according to Example 3 are of similar types to those illustrated in FIGS. 1 and 5, respectively. The description herein centers on the differences.

Figure 11:
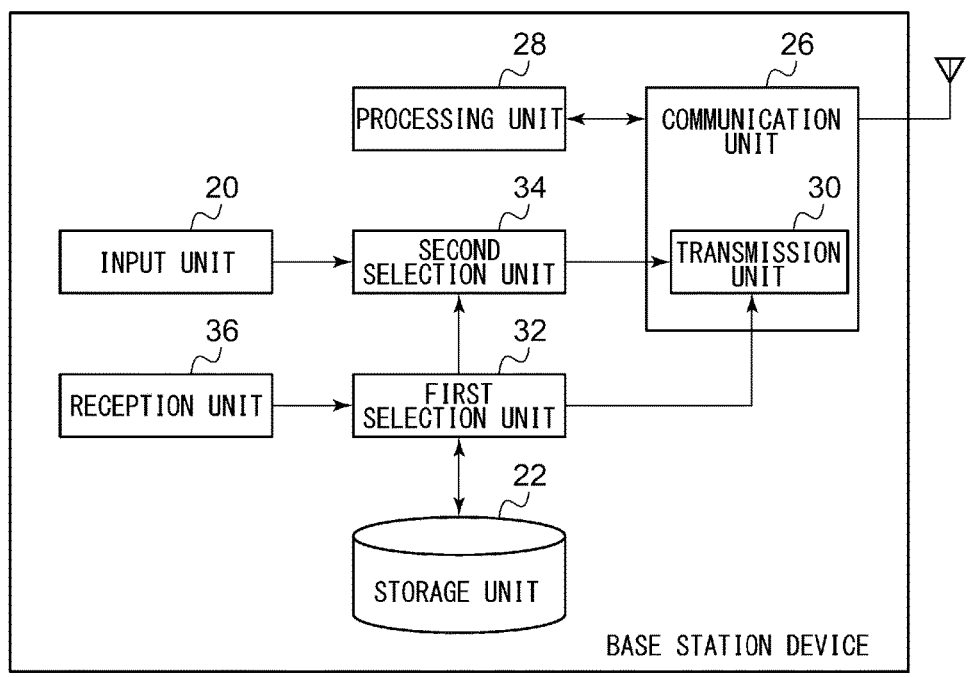
FIG. 11 is a view illustrating a configuration of a base station device according to Example 3.

FIG. 11 illustrates a configuration of abase station device 14 according to Example 3. The base station device 14 includes an input unit 20, a storage unit 22, a communication unit 26, a processing unit 28, a first selection unit 32, a second selection unit 34, and a reception unit 36. The communication unit 26 includes a transmission unit 30. The storage unit 22 stores a plurality of types of lists. As illustrated in FIG. 9, an identifier for identifying a list ("hereinafter, referred to as an "list No.") is given to each list. Also herein, the size of an area is different for every list. Alternatively, areas each having a size different from the others may be combined in one list.

The reception unit 36 receives an instruction for changing the size of an area (hereinafter, referred to as "list information") from a command device 10. The list information includes information for identifying a list No. Herein, a commander of the headquarters selects a list to be used in accordance with the content of an event, and inputs the selected list to the command device 10. Information on the selected list is output from the command device 10 as the list information. The reception unit 36 outputs the list information to the first selection unit 32.

The first selection unit 32 inputs the list information from the reception unit 36. The first selection unit 32 selects a list No. corresponding to the list information from the storage unit 22. The first selection unit 32 outputs the selected list No. to the transmission unit 30. The transmission unit 30 inputs the list No. from the first selection unit 32, and transmits the list No. After the transmission unit 30 transmits the list No., the second selection unit 34 inputs call information from the input unit 20. The second selection unit 34 selects, from the list selected in the first selection unit 32, an area No. corresponding to the positional information included in the call information. The second selection unit 34 generates a call signal including the selected one or more area Nos., and outputs it to the transmission unit 30.

In the terminal device 16 of FIG. 5, the storage unit 52 stores a plurality of types of lists. These lists are the same as those stored in the storage unit 22 in FIG. 11. That is, a plurality of types of lists, to which the same list Nos. as those stored in the storage unit 22 have been given, are stored. The communication unit 58 receives information on a list to be used, i.e., a list No., from the base station device 14. The communication unit 58 outputs the list No. to the selection unit 54 via the control unit 56. The selection unit 54 inputs the list No. The selection unit 54 selects, from the plurality of types of lists stored in the storage unit 52, a list that matches the received list No. Further, the selection unit 54 selects, from the selected list, an area No. corresponding to the positional information acquired in the acquisition unit 50. The selection unit 54 outputs the selected area No. to the control unit 56.

Figure 12:
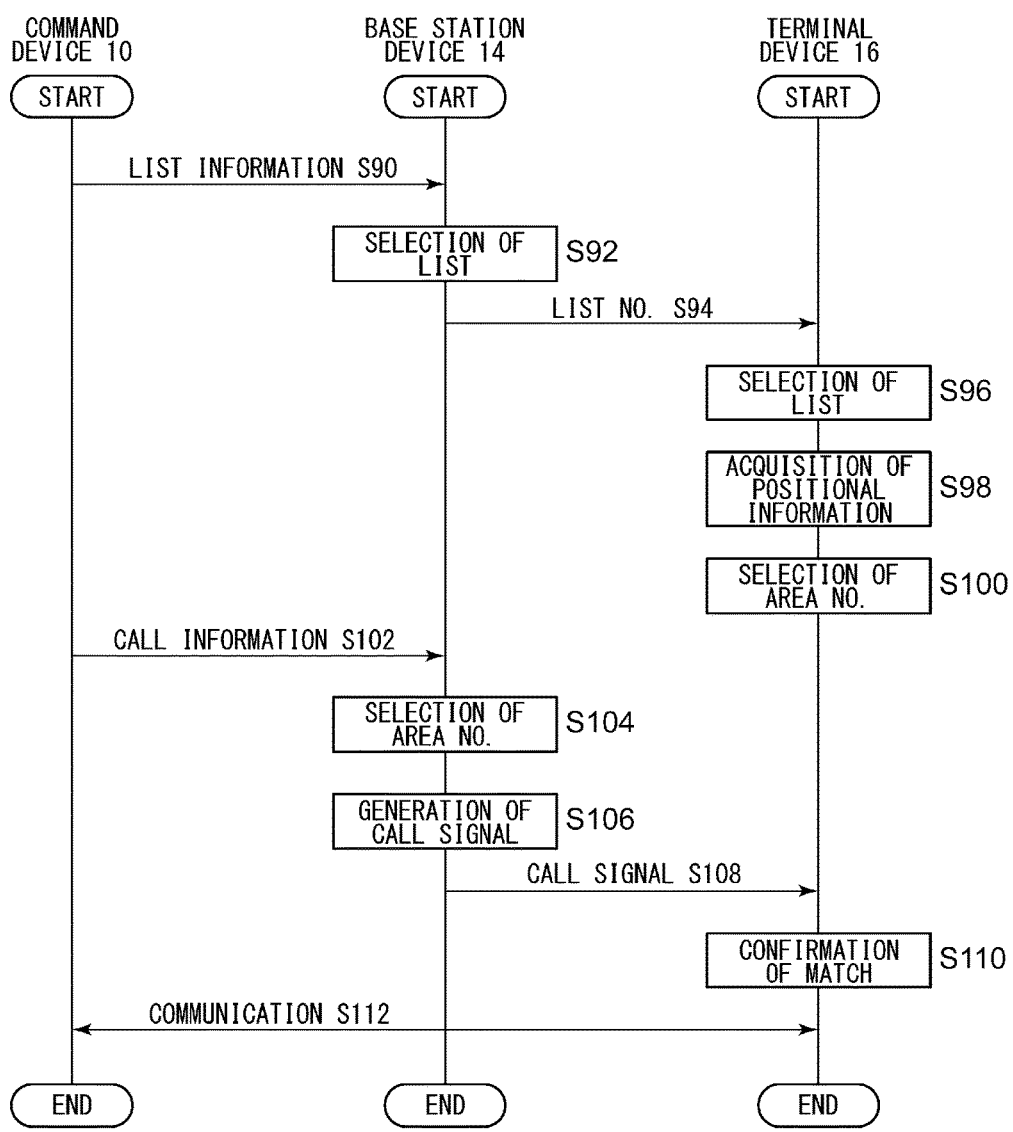
FIG. 12 is a sequence diagram illustrating communication procedures by a communication system according to Example 3.

An operation of the communication system 100 configured as described above will be described. FIG. 12 is a sequence diagram illustrating communication procedures by the communication system 100 according to Example 3. The command device 10 transmits list information to the base station device 14 (S90). The base station device 14 selects a list (S92). The base station device 14 transmits the list No. (S94). The terminal device 16 selects a list (S96). The terminal device 16 acquires positional information (S98). The terminal device 16 selects an area No. (first area No.) (S100). The command device 10 transmits call information to the base station device 14 (S102). The base station device 14 selects an area No. (second area No.) (S104), and generates a call signal (S106). The base station device 14 transmits the call signal (S108). When the terminal device 16 confirms the match between the first area No. and the second area No. (S110), the command device 10 and the terminal device 16 execute communication (S112).

According to the present Example, a list is switched in accordance with the received list No., and hence a list reflecting the intention of a commander can be used. Further, a list reflecting the intention of a commander is used, and hence only persons close to a scene can be called. Furthermore, only persons close to a scene are called, and hence it can be avoided to call many persons uselessly. Still furthermore, the range of an area No. is changed in accordance with the type of an event that has occurred, and hence it becomes possible to call the requisite minimum number of persons. Still furthermore, it becomes possible to call the requisite minimum number of persons, and hence useless motion (an unnecessary person hastens to a scene, etc.) can be avoided.

Example 4

Example 4 will now be described. Similarly to the above description, Example 4 corresponds to business-use radio, and relates to a communication system in which a terminal device is called by an area No. Each of a base station device and the terminal device in Example 4 also hold a plurality of lists, so that one common list is selected and used in accordance with a predetermined condition. Herein, particularly in order to execute a call by changing the size of an area in accordance with the density of terminal devices, a list is changed in accordance with the density thereof. When a crime has occurred at a location and it is desirable to dispatch policemen there, and when many policemen are present near a location where the crime has occurred, it is more desirable to call only policemen present nearby by making an area near the location smaller. On the other hand, when a small number of policemen are present near a location where a crime has occurred, it is possible to call policeman present within a somewhat broad range by making an area near the location large. It is more desirable that a response can be guaranteed even when the area is large (even when pinpoint accuracy is decreased) than that no policeman is present in a desired area and there is no response. A communication system 100 and a terminal device 16 according to Example 4 are of similar types to those illustrated in FIGS. 1 and 5, respectively. The description herein centers on the differences.

Figure 13:
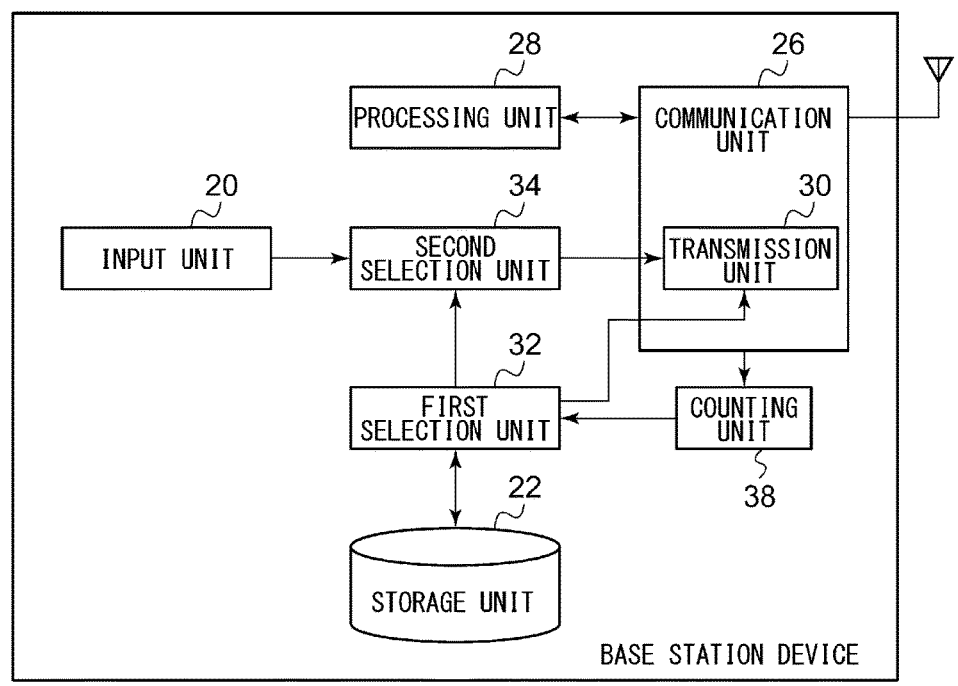
FIG. 13 is a view illustrating a configuration of a base station device according to Example 4.

FIG. 13 illustrates a configuration of a base station device 14 according to Example 4. The base station device 14 includes an input unit 20, a storage unit 22, a communication unit 26, a processing unit 28, a first selection unit 32, a second selection unit 34, and a counting unit 38. The communication unit 26 includes a transmission unit 30. The counting unit 38 counts the number of the terminal devices 16 connected to the base station device 14 over a predetermined period. Herein, the counting may be performed for every area or every area group in which a plurality of areas are collected. Accordingly, it can be said that the number of the counted terminal devices 16 is a density in an area or an area group. In the following description, every area is adopted for clarity of the description. The counting unit 38 outputs a result of the counting to the first selection unit 32. The storage unit 22 stores a plurality of types of lists. Also herein, the size of an area is different for every list. Alternatively, areas each having a size different from the others may be combined in one list.

The first selection unit 32 selects, from the plurality of types of lists stored in the storage unit 22, a list corresponding to the size of an area in accordance with a result of the counting in the counting unit 38. For example, when the number of the terminal devices 16 in an area is larger than a first threshold value, the first selection unit 32 selects a list in which the area is small; and when the number of the terminal devices 16 is lower than or equal to a second threshold value, it selects a list in which the area is large. This is equivalent to the fact that an area is divided when a density is high, while an area is annexed when a density is low. When a density in a specific area becomes high after an area having a size of 1 km×1 km is divided into areas each having a size of 100 m×100 m, the specific area may further be subdivided (e.g., 50 m×50 m). Thus, the size of an area may be changed multiple times in accordance with a density. The first selection unit 32 outputs a list No. corresponding to the selected list to the transmission unit 30. Because the processing in the terminal device 16 is the same as that in Example 3, description thereof will be omitted herein.

Figure 14:
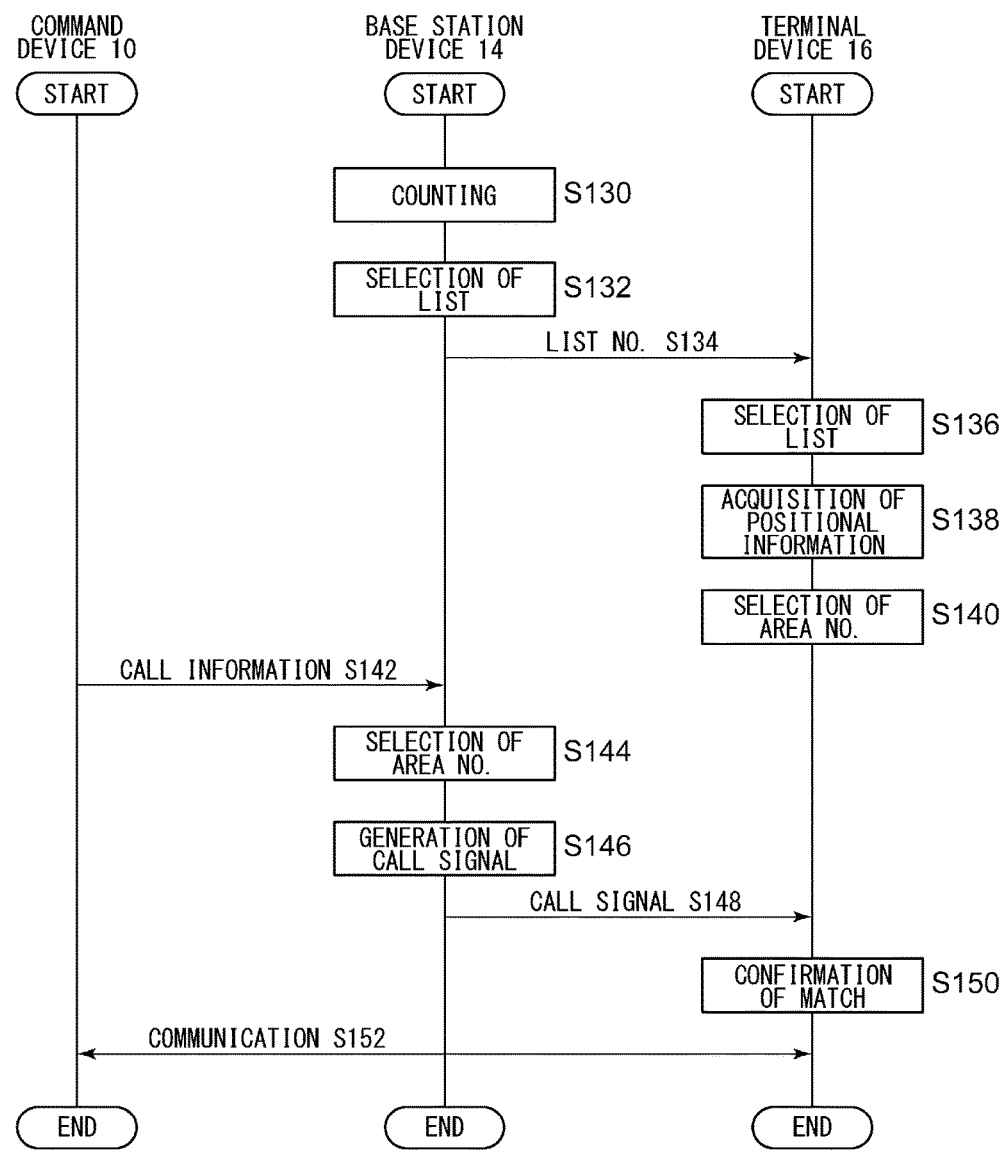
FIG. 14 is a sequence diagram illustrating communication procedures by a communication system according to Example 4.

An operation of the communication system 100 configured as described above will be described. FIG. 14 is a sequence diagram illustrating communication procedures by the communication system 100 according to Example 4. The base station device 14 counts the number of the terminal devices 16 (S130). The base station device 14 selects a list (S132). The base station device 14 transmits a list No. (S134). The terminal device 16 selects a list (S136). The terminal device 16 acquires positional information (S138). The terminal device 16 selects an area No. (first area No.) (S140). The command device 10 transmits call information to the base station device 14 (S142). The base station device 14 selects an area No. (second area No.) (S144), and generates a call signal (S146). The base station device 14 transmits the call signal (S148). When the terminal device 16 confirms the match between the first area No. and the second area No. (S150), the command device 10 and the terminal device 16 execute communication (S152).

According to the present Example, the size of an area is changed in accordance with the number of terminal devices, and hence an efficient call can be achieved. Further, an efficient call is achieved, and hence a useless call can be suppressed. Furthermore, a list is switched only by receiving a list No., and hence an increase in a traffic amount can be suppressed.

Example 5

Example 5 will now be described. Similarly to the above description, Example 5 corresponds to business-use radio, and relates to a communication system in which a terminal device is called by an area No. Each of the base station device and the terminal device in Example 3 or 4 holds a plurality of lists, and the base station device 14 notifies the terminal device 16 of a list No. to be used. On the other hand, Example 5 is intended to improve the flexibility of a list. Accordingly, a base station device 14 transmits a new list to a terminal device 16, so that a list stored in the terminal device 16 is updated. A communication system 100 and the terminal device 16 according to Example 5 are of similar types to those illustrated in FIGS. 1 and 5, respectively. The base station device 14 according to Example 5 is of the same type as that of FIG. 11 or FIG. 13. The description herein centers on the differences.

The storage unit 22 in FIG. 11 or FIG. 13 stores a new list. The transmission unit 30 transmits the new list stored in the storage unit 22. On the other hand, the communication unit 58 in FIG. 5 receives a new list from the base station device 14. The storage unit 52 stores the list received in the communication unit 58. With such processing, the list stored in the storage unit 52 is updated by the base station device 14. Alternatively, the transmission unit 30 may transmit the new list stored in the storage unit 22 and the list No. of the list by associating them together. In that case, the storage unit 52 stores the list and the list No. received in the communication unit 58 by associating them together. In the second or later use of the list, it is possible for the base station device 14 to notify the terminal device 16 of a list to be used, similarly to Examples 3 and 4.

Figure 15:
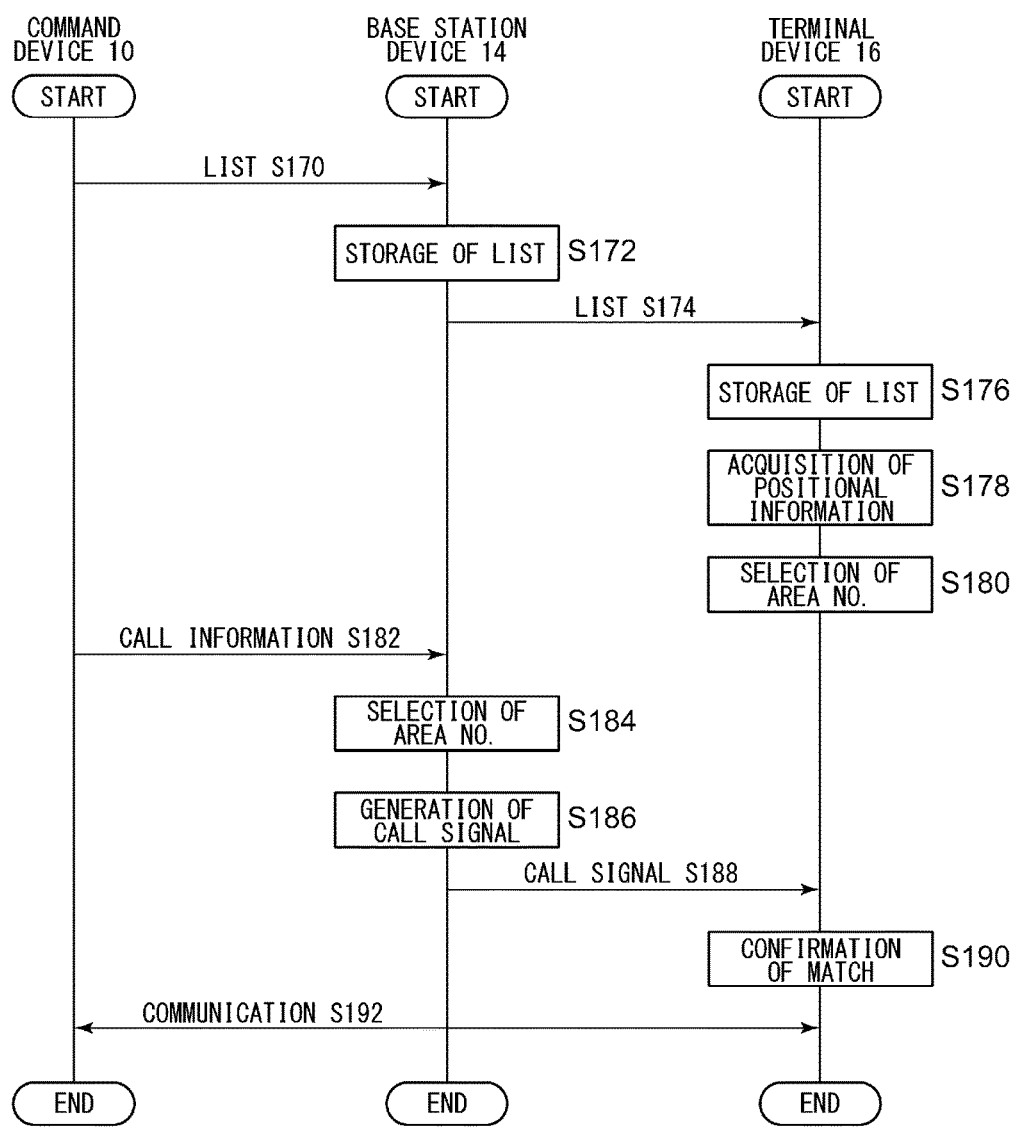
FIG. 15 is a sequence diagram illustrating communication procedures by a communication system according to Example 5.

An operation of the communication system 100 configured as described above will be described. FIG. 15 is a sequence diagram illustrating communication procedures by the communication system 100 according to Example 5. A command device 10 transmits a list to the base station device 14 (S170). The base station device 14 stores the list (S172). The base station device 14 transmits the list (S174). The terminal device 16 stores the list (S176). The terminal device 16 acquires positional information (S178). The terminal device 16 selects an area No. (first area No.) (S180). The command device 10 transmits call information to the base station device 14 (S182). The base station device 14 selects an area No. (second area No.) (S184), and generates a call signal (S186). The base station device 14 transmits the call signal (S188). When the terminal device 16 confirms the match between the first area No. and the second area No. (S190), the command device 10 and the terminal device 16 execute communication (S192).

According to the present Example, a list is received, and hence a new list can also be dealt with. Further, a new list is also dealt with, and hence a list can be flexibly changed. Furthermore, a new list can also be dealt with, and hence the flexibility of a communication system can be improved.

The present invention has been described above based on examples. These examples are illustrative in nature, and it should be appreciated by a person skilled in the art that various modifications can be made to the combinations of the components and the processing processes and such modifications also fall within the scope of the present invention.

According to the present Examples, the communication system 100 uses business-use radio. However, without being limited to this, for example, a wireless communication system other than business-use radio may be used. According to the present Examples, the flexibility of a configuration can be improved.

In any one of the present Examples 1 to 5, the selection of an area No., that of a list, and the storage of a list are performed in the base station device 14. However, without being limited to this, at least one processing of them may be performed, for example, in a combination of the command device 10 and the base station device 14 or in the command device 10. According to the present variation, the flexibility of a configuration can be improved.

What is claimed is:

1. A terminal device comprising:
a storage unit that stores a list in which a correspondence relationship between coordinates of a plurality of areas defined and identifiers is included, the plurality of areas being formed by dividing a predetermined area and being displayable on a map;
an acquisition unit that acquires positional information indicating latitude and longitude of the terminal device;
a selection unit that compares coordinates of an area included in the list stored in the storage unit with the positional information acquired in the acquisition unit, identifies an area including the positional information acquired, and selects an identifier corresponding to the area identified;
a communication unit that receives, from a calling device, a call signal including an identifier to be called; and
a control unit that, when the identifier included in the call signal received in the communication unit matches the identifier selected in the selection unit, makes the communication unit execute communication.

2. The terminal device according to claim 1, wherein the storage unit stores a plurality of lists, and wherein the selection unit switches to and uses one of the plurality of lists stored in the storage unit.

3. The terminal device according to claim 2, wherein the selection unit autonomously executes the switching in accordance with a predetermined rule.

4. The terminal device according to claim 3, wherein the selection unit autonomously executes the switching in accordance with a predetermined rule using at least one information of time information, calendar information, and sensor information.

5. The terminal device according to claim 2, wherein the communication unit receives information on a list to be used from the calling device, and wherein the selection unit executes the switching in accordance with the information received in the communication unit.

6. The terminal device according to claim 1, wherein the communication unit receives a list from the calling device, and wherein the storage unit stores the list received in the communication unit.

7. A communication system comprising:
a calling device; and
a terminal device, wherein
the terminal device includes:
a storage unit that stores a list in which a correspondence relationship between coordinates of a plurality of areas defined and identifiers is included, the plurality of areas being formed by dividing a predetermined area and being displayable on a map;
an acquisition unit that acquires positional information indicating latitude and longitude of the terminal device;
a selection unit that compares coordinates of an area included in the list stored in the storage unit with the positional information acquired in the acquisition unit, identifies an area including the positional information acquired, and selects an identifier corresponding to the area identified;
a communication unit that receives, from the calling device, a call signal including an identifier to be called; and
a control unit that, when the identifier included in the call signal received in the communication unit matches the identifier selected in the selection unit, makes the communication unit execute communication.

8. A communication method comprising the steps of:
acquiring positional information indicating latitude and longitude of a terminal device;
where a plurality of areas formed by dividing a predetermined area and displayable on a map are defined and a list including a correspondence relationship between coordinates of the areas and identifiers is stored in a memory, comparing coordinates of an area included in the list stored with the positional information acquired, identifying an area including the positional information acquired, and selecting an identifier corresponding to the area identified;
receiving, from a calling device, a call signal including an identifier to be called; and
executing communication when the identifier included in the received call signal matches the selected identifier.

* * * * *